US012323823B2

(12) United States Patent
Bedekar

(10) Patent No.: US 12,323,823 B2
(45) Date of Patent: Jun. 3, 2025

(54) METHOD, APPARATUS AND MEDIUM FOR ADJUSTING TRANSMISSION PROPERTY

(71) Applicant: Nokia Solutions and Networks Oy, Espoo (FI)

(72) Inventor: Anand Bedekar, Glenview, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 645 days.

(21) Appl. No.: 17/268,264

(22) PCT Filed: Aug. 20, 2018

(86) PCT No.: PCT/US2018/047055
§ 371 (c)(1),
(2) Date: Feb. 12, 2021

(87) PCT Pub. No.: WO2020/040723
PCT Pub. Date: Feb. 27, 2020

(65) Prior Publication Data
US 2021/0306874 A1 Sep. 30, 2021

(51) Int. Cl.
*H04W 24/02* (2009.01)
*H04L 1/00* (2006.01)
(Continued)

(52) U.S. Cl.
CPC .......... *H04W 24/02* (2013.01); *H04L 1/0003* (2013.01); *H04L 1/0004* (2013.01); *H04L 1/001* (2013.01);
(Continued)

(58) Field of Classification Search
CPC . H04W 24/02; H04W 74/0833; H04W 28/18; H04L 1/0003; H04L 1/001;
(Continued)

(56) References Cited

U.S. PATENT DOCUMENTS

2014/0313908 A1 10/2014 Da Silva et al.
2015/0023281 A1 1/2015 Wu ............................... 370/329
(Continued)

FOREIGN PATENT DOCUMENTS

CN 102158901 A 8/2011
CN 102271367 A 12/2011
(Continued)

OTHER PUBLICATIONS

English translation of WO 2008044526 A1, 2008, retrieved from PE2E Search on Aug. 12, 2023 (Year: 2008).*
(Continued)

*Primary Examiner* — Omar J Ghowrwal
(74) *Attorney, Agent, or Firm* — McCarter & English, LLP

(57) ABSTRACT

An apparatus comprising means for performing: receiving policy information for one or more transmissions in a radio access network; receiving data from the radio access network; determining an adjustment to one or more properties of the one or more transmissions in the radio access network, based on the received policy information and the data received from the radio access network; communicating an indication of the adjustment to the radio access network; wherein the transmissions comprise internet of things transmissions.

18 Claims, 7 Drawing Sheets

(51) Int. Cl.
*H04L 1/1825* (2023.01)
*H04W 74/0833* (2024.01)
*H04L 1/08* (2006.01)
*H04W 28/18* (2009.01)

(52) U.S. Cl.
CPC .......... *H04L 1/0015* (2013.01); *H04L 1/1825* (2013.01); *H04W 74/0833* (2013.01); *H04L 1/08* (2013.01); *H04W 28/18* (2013.01)

(58) Field of Classification Search
CPC ....... H04L 1/1825; H04L 1/08; H04L 1/0004; H04L 1/0015
See application file for complete search history.

(56) References Cited

U.S. PATENT DOCUMENTS

| | | | |
|---|---|---|---|
| 2015/0334746 A1 | 11/2015 | Sun et al. | 74/833 |
| 2017/0093540 A1 | 3/2017 | Lei et al. | |
| 2017/0126355 A1 | 5/2017 | Reial et al. | 1/9 |
| 2017/0155476 A1* | 6/2017 | Polehn | H04L 1/1835 |
| 2017/0311169 A1 | 10/2017 | Cai et al. | |
| 2018/0035351 A1 | 2/2018 | Kodaypak | |
| 2018/0049164 A1 | 2/2018 | Wu et al. | |
| 2018/0077696 A1 | 3/2018 | Lee et al. | |
| 2019/0053313 A1* | 2/2019 | Zhou | H04W 52/50 |

FOREIGN PATENT DOCUMENTS

| | | |
|---|---|---|
| CN | 103716129 A | 4/2014 |
| CN | 105934973 A | 9/2016 |
| CN | 107409008 A | 11/2017 |
| CN | 107580360 A | 1/2018 |
| CN | 108111964 A | 6/2018 |
| EP | 2 451 238 A1 | 5/2012 |
| EP | 2947922 A1 * | 11/2015 ............ H04W 48/02 |
| EP | 3531741 A1 | 8/2019 |
| WO | WO-2008044526 A1 * | 4/2008 ............ H04W 36/06 |
| WO | WO-2012/157925 A2 | 11/2012 |
| WO | WO-2016/091298 A1 | 6/2016 |
| WO | 2017/189043 A1 | 11/2017 |
| WO | 2018/031300 A1 | 2/2018 |
| WO | 2019/145171 A1 | 8/2019 |

OTHER PUBLICATIONS

Office action received for corresponding European Patent Application No. 18782540.1, dated Feb. 10, 2023, 4 pages.
"How Many vRAN Initiatives Does it Take to Open the Radio Network?", sdxcentral, Retrieved on Feb. 12, 2021, Webpage available at : https://www.sdxcentral.com/articles/opinion-editorial/many-vran-initiatives-take-open-radio-network/2018/02/.
Beyene et al., "On the Performance of Narrow-Band Internet of Things (Nb-IoT)", IEEE Wireless Communications and Networking Conference (WCNC), Mar. 19-22, 2017, 3 Pages.
International Search Report and Written Opinion received for corresponding Patent Cooperation Treaty Application No. PCT/US2018/047055, dated Nov. 21, 2018, 17 pages.
"Data Transmission During Random Access Procedure", 3GPP TSG RAN WG1 Meeting #92bis, R1-1804251, Agenda: 6.2.7.1.2, Nokia, Apr. 16-20, 2018, 5 pages.
"Msg3 Hndling in Early Data Transmission", 3GPP TSG-RAN WG2 #101bis, R2-1805175, Agenda: 9.14.2, Ericsson, Apr. 16-20, 2018, 5 pages.
"Chairman's Notes of AI 6.2.6 Even Further Enhanced MTC for LTE", 3GPP TSG RAN WG1 Meeting #93, R1-1807536, Agenda: 6.2.6, Ad-Hoc chair (NTT Docomo, Inc.), May 21-25, 2018, 8 pages.

* cited by examiner

METHOD, APPARATUS AND MEDIUM FOR ADJUSTING TRANSMISSION PROPERTY

RELATED APPLICATION

This application claims priority to PCT Application No. PCT/US2018/047055, filed on Aug. 20, 2018 which is incorporated herein by reference in its entirety.

TECHNICAL FIELD

Various examples relate to a method, apparatus and a computer program. More particularly, various examples relate to network optimization.

BACKGROUND

A network may comprise several entities communicating via transmissions with one another. Coverage and throughput of a network may be optimized by adjusting attributes of transmissions in the network.

SUMMARY

According to a first aspect, there is provided an apparatus comprising means for performing: receiving policy information for one or more transmissions in a radio access network; receiving data from the radio access network; determining an adjustment to one or more properties of the one or more transmissions in the radio access network, based on the received policy information and the data received from the radio access network; communicating an indication of the adjustment to the radio access network; wherein the transmissions comprise internet of things transmissions.

According to some examples, the internet of things transmissions comprise at least one of: narrowband internet things of transmissions; enhanced machine-type communications transmissions; long term evolution for machines transmissions; cellular internet of things transmissions.

According to some examples, the one or more transmissions in the radio access network comprise an initial transmission on a downlink data channel to a user equipment or an initial transmission on an uplink data channel from a user equipment.

According to some examples, the data received from the radio access network comprises data of previous transmissions in the radio access network.

According to some examples, the data received from the radio access network comprises information related to attributes of uplink or downlink transmissions performed by the radio access network.

According to some examples, the data of previous transmissions in the radio access network comprises data of one or more of: a number of repetitions used in at least one previous transmission; a power level of at least one previous transmission; a modulation and coding scheme used in at least one previous transmission.

According to some examples, the policy information comprises weighting information or priority information of one or more of: radio access network coverage; radio access network throughput; power consumption of at least one device connected to the radio access network.

According to some examples, the data received from the radio access network comprises information related to the outcome of transmissions in the radio access network.

According to some examples, the data received from the radio access network comprises information of a ratio of acknowledgments to negative acknowledgements or a number of retransmissions attempted.

According to some examples, the determining an adjustment to one or more properties of one or more transmissions in the radio access network comprises using the ratio of acknowledgments to negative acknowledgements or a number of retransmissions attempted.

According to some examples, the data received from the radio access network comprises an indication of a quality of a signal received, for uplink transmission, by a base station in the radio access network, wherein the data comprises at least one of: received random access channel power; received physical uplink shared channel power; interference levels; noise levels.

According to some examples, the data received from the radio access network comprises information related to the attributes of received random access transmissions.

According to some examples, the data received from the radio access network comprises information related to attributes of received random access transmissions, wherein the information related to the attributes of received random access transmissions comprises at least one of: a detected preamble, a received power level; a timing advance calculated from a random access channel; an angle of arrival; a direction of arrival; and a radio network temporary identifier.

According to some examples, the data received from the radio access network may be related to transmissions to/from individual UEs.

According to some examples, the data received from the radio access network may be related to a metric aggregated across multiple transmissions to and/or from an individual UE.

According to some examples, the data received from the radio access network may be related to a metric aggregated across transmissions to and/or from a plurality of UEs.

According to some examples, the one or more properties comprise one or more of: a modulation and coding scheme; a repetition level for transmissions in the radio access network; a number of control channel elements; a transmit power level; a power control adjustment.

According to some examples, the determining an adjustment to one or more properties of one or more transmissions in the radio access network comprises using machine learning.

According to some examples, the apparatus further comprises means for: receiving a request from the radio access network, the request comprising attributes of a random access channel message received by the radio access network, and providing, to the radio access network in response to the request, appropriate transmission attributes for responding to the random access channel message.

According to some examples the appropriate transmission attributes for responding to a message on the random access channel comprise information of at least one of: a modulation and coding scheme for transmission; a repetition level for transmission and/or aggregation level for downlink control messages.

According to some examples, communicating an indication of the adjustment to the radio access network comprises providing to the radio access network at least one of: an adjustment to a modulation and coding scheme and/or repetition rate to use for initial transmissions; an adjustment to the increment and/or decrement that is used by the radio access network to adapt a modulation and coding scheme and/or repetition rate on receiving an acknowledgement or a negative acknowledgement for a transmission; an adjustment to at least one control channel element and/or aggregation level for a narrowband physical downlink control channel in the radio access network; a mapping of random access channel signatures to the adjustments to transmission attributes for downlink and/or uplink transmissions in the radio access network.

According to some examples, a random access channel signature comprises at least one of: a received power level for a random access transmission; a timing advance calculated from a random access channel transmission; a direction or angle of arrival for a received random access channel transmission.

According to a second aspect, there is provided a method comprising: receiving policy information for one or more transmissions in a radio access network; receiving data from the radio access network; determining an adjustment to one or more properties of the one or more transmissions in the radio access network, based on the received policy information and the data received from the radio access network; communicating an indication of the adjustment to the radio access network; wherein the transmissions comprise internet of things transmissions.

According to some examples, the internet of things transmissions comprise at least one of: narrowband internet things of transmissions; enhanced machine-type communications transmissions; long term evolution for machines transmissions; cellular internet of things transmissions.

According to some examples, the one or more transmissions in the radio access network comprise an initial transmission on a downlink data channel to a user equipment or an initial transmission on an uplink data channel from a user equipment.

According to some examples, the data received from the radio access network comprises data of previous transmissions in the radio access network.

According to some examples, the data received from the radio access network comprises information related to attributes of uplink or downlink transmissions performed by the radio access network.

According to some examples, the data of previous transmissions in the radio access network comprises data of one or more of: a number of repetitions used in at least one previous transmission; a power level of at least one previous transmission; a modulation and coding scheme used in at least one previous transmission.

According to some examples, the policy information comprises weighting information or priority information of one or more of: radio access network coverage; radio access network throughput; power consumption of at least one device connected to the radio access network.

According to some examples, the data received from the radio access network comprises information related to the outcome of transmissions in the radio access network.

According to some examples, the data received from the radio access network comprises information of a ratio of acknowledgments to negative acknowledgements or a number of retransmissions attempted.

According to some examples, the determining an adjustment to one or more properties of one or more transmissions in the radio access network comprises using the ratio of acknowledgments to negative acknowledgements or a number of retransmissions attempted.

According to some examples, the data received from the radio access network comprises an indication of a quality of a signal received, for uplink transmission, by a base station in the radio access network, wherein the data comprises at least one of: received random access channel power; received physical uplink shared channel power; interference levels; noise levels.

According to some examples, the data received from the radio access network comprises information related to the attributes of received random access transmissions.

According to some examples, the data received from the radio access network comprises information related to attributes of received random access transmissions, wherein the information related to the attributes of received random access transmissions comprises at least one of: a detected preamble, a received power level; a timing advance calculated from a random access channel; an angle of arrival; a direction of arrival; and a radio network temporary identifier.

According to some examples, the data received from the radio access network may be related to transmissions to/from individual UEs.

According to some examples, the data received from the radio access network may be related to a metric aggregated across multiple transmissions to and/or from an individual UE.

According to some examples, the data received from the radio access network may be related to a metric aggregated across transmissions to and/or from a plurality of UEs.

According to some examples, the one or more properties comprise one or more of: a modulation and coding scheme; a repetition level for transmissions in the radio access network; a number of control channel elements; a transmit power level; a power control adjustment.

According to some examples, the determining an adjustment to one or more properties of one or more transmissions in the radio access network comprises using machine learning.

According to some examples, the method comprises: receiving a request from the radio access network, the request comprising attributes of a random access channel message received by the radio access network, and providing, to the radio access network in response to the request, appropriate transmission attributes for responding to the random access channel message.

According to some examples the appropriate transmission attributes for responding to a message on the random access channel comprise information of at least one of: a modulation and coding scheme for transmission; a repetition level for transmission and/or aggregation level for downlink control messages.

According to some examples, communicating an indication of the adjustment to the radio access network comprises providing to the radio access network at least one of: an adjustment to a modulation and coding scheme and/or repetition rate to use for initial transmissions; an adjustment to the increment and/or decrement that is used by the radio access network to adapt a modulation and coding scheme and/or repetition rate on receiving an acknowledgement or a negative acknowledgement for a transmission; an adjustment to at least one control channel element and/or aggregation level for a narrowband physical downlink control channel in the radio access network; a mapping of random access channel signatures to the adjustments to transmission attributes for downlink and/or uplink transmissions in the radio access network.

According to some examples, a random access channel signature comprises at least one of: a received power level for a random access transmission; a timing advance calculated from a random access channel transmission; a direction or angle of arrival for a received random access channel transmission.

According to a third aspect, there is provided a computer program comprising instructions for causing an apparatus to perform at least the following: receiving policy information for one or more transmissions in a radio access network; receiving data from the radio access network; determining an adjustment to one or more properties of the one or more transmissions in the radio access network, based on the received policy information and the data received from the radio access network; communicating an indication of the adjustment to the radio access network; wherein the transmissions comprise internet of things transmissions.

According to a fourth aspect there is provided an apparatus comprising: at least one processor; at least one memory including computer program code; wherein the at least one memory and computer program code is configured to, with the at least one processor, cause the apparatus at least to perform: receiving policy information for one or more transmissions in a radio access network; receiving data from the radio access network; determining an adjustment to one or more properties of the one or more transmissions in the radio access network, based on the received policy information and the data received from the radio access network; communicating an indication of the adjustment to the radio access network; wherein the transmissions comprise internet of things transmissions.

According to a fifth aspect, there is provided a non-transitory computer readable medium comprising program instructions for causing an apparatus to perform at least the following: receiving policy information for one or more transmissions in a radio access network; receiving data from the radio access network; determining an adjustment to one or more properties of the one or more transmissions in the radio access network, based on the received policy information and the data received from the radio access network; communicating an indication of the adjustment to the radio access network; wherein the transmissions comprise internet of things transmissions According to some examples, the internet of things transmissions comprise at least one of: narrowband internet things of transmissions; enhanced machine-type communications transmissions; long term evolution for machines transmissions; cellular internet of things transmissions.

According to some examples, the one or more transmissions in the radio access network comprise an initial transmission on a downlink data channel to a user equipment or an initial transmission on an uplink data channel from a user equipment.

According to some examples, the data received from the radio access network comprises data of previous transmissions in the radio access network.

According to some examples, the data received from the radio access network comprises information related to attributes of uplink or downlink transmissions performed by the radio access network.

According to some examples, the data of previous transmissions in the radio access network comprises data of one or more of: a number of repetitions used in at least one previous transmission; a power level of at least one previous transmission; a modulation and coding scheme used in at least one previous transmission.

According to some examples, the policy information comprises weighting information or priority information of one or more of: radio access network coverage; radio access network throughput; power consumption of at least one device connected to the radio access network.

According to some examples, the data received from the radio access network comprises information related to the outcome of transmissions in the radio access network.

According to some examples, the data received from the radio access network comprises information of a ratio of acknowledgments to negative acknowledgements or a number of retransmissions attempted.

According to some examples, the determining an adjustment to one or more properties of one or more transmissions in the radio access network comprises using the ratio of acknowledgments to negative acknowledgements or a number of retransmissions attempted.

According to some examples, the data received from the radio access network comprises an indication of a quality of a signal received, for uplink transmission, by a base station in the radio access network, wherein the data comprises at least one of: received random access channel power; received physical uplink shared channel power; interference levels; noise levels.

According to some examples, the data received from the radio access network comprises information related to the attributes of received random access transmissions.

According to some examples, the data received from the radio access network comprises information related to attributes of received random access transmissions, wherein the information related to the attributes of received random access transmissions comprises at least one of: a detected preamble, a received power level; a timing advance calculated from a random access channel; an angle of arrival; a direction of arrival; and a radio network temporary identifier.

According to some examples, the data received from the radio access network may be related to transmissions to/from individual UEs.

According to some examples, the data received from the radio access network may be related to a metric aggregated across multiple transmissions to and/or from an individual UE.

According to some examples, the data received from the radio access network may be related to a metric aggregated across transmissions to and/or from a plurality of UEs.

According to some examples, the one or more properties comprise one or more of: a modulation and coding scheme; a repetition level for transmissions in the radio access network; a number of control channel elements; a transmit power level; a power control adjustment.

According to some examples, the determining an adjustment to one or more properties of one or more transmissions in the radio access network comprises using machine learning.

According to some examples, the apparatus is caused to perform: receiving a request from the radio access network, the request comprising attributes of a random access channel message received by the radio access network, and providing, to the radio access network in response to the request, appropriate transmission attributes for responding to the random access channel message.

According to some examples the appropriate transmission attributes for responding to a message on the random access channel comprise information of at least one of: a modulation and coding scheme for transmission; a repetition level for transmission and/or aggregation level for downlink control messages.

According to some examples, communicating an indication of the adjustment to the radio access network comprises providing to the radio access network at least one of: an adjustment to a modulation and coding scheme and/or repetition rate to use for initial transmissions; an adjustment to the increment and/or decrement that is used by the radio access network to adapt a modulation and coding scheme and/or repetition rate on receiving an acknowledgement or a negative acknowledgement for a transmission; an adjustment to at least one control channel element and/or aggregation level for a narrowband physical downlink control channel in the radio access network; a mapping of random access channel signatures to the adjustments to transmission attributes for downlink and/or uplink transmissions in the radio access network.

According to some examples, a random access channel signature comprises at least one of: a received power level for a random access transmission; a timing advance calculated from a random access channel transmission; a direction or angle of arrival for a received random access channel transmission.

According to a sixth aspect there is provided a computer program comprising instructions stored thereon for performing at least the following: receiving policy information for one or more transmissions in a radio access network; receiving data from the radio access network; determining an adjustment to one or more properties of the one or more transmissions in the radio access network, based on the received policy information and the data received from the radio access network; communicating an indication of the adjustment to the radio access network; wherein the transmissions comprise internet of things transmissions.

According to a seventh aspect there is provided a non-transitory computer readable medium comprising program instructions thereon for performing at least the following: receiving policy information for one or more transmissions in a radio access network; receiving data from the radio access network; determining an adjustment to one or more properties of the one or more transmissions in the radio access network, based on the received policy information and the data received from the radio access network; communicating an indication of the adjustment to the radio access network; wherein the transmissions comprise internet of things transmissions In the above, various aspects have been described. It should be appreciated that further aspects may be provided by the combination of any two or more of the aspects described above.

Various other aspects and further embodiments are also described in the following detailed description and in the attached claims.

BRIEF DESCRIPTION OF THE DRAWINGS

To assist understanding of the present disclosure and to show how some embodiments may be put into effect, reference is made by way of example only to the accompanying drawings in which.

DETAILED DESCRIPTION

Figure 1:
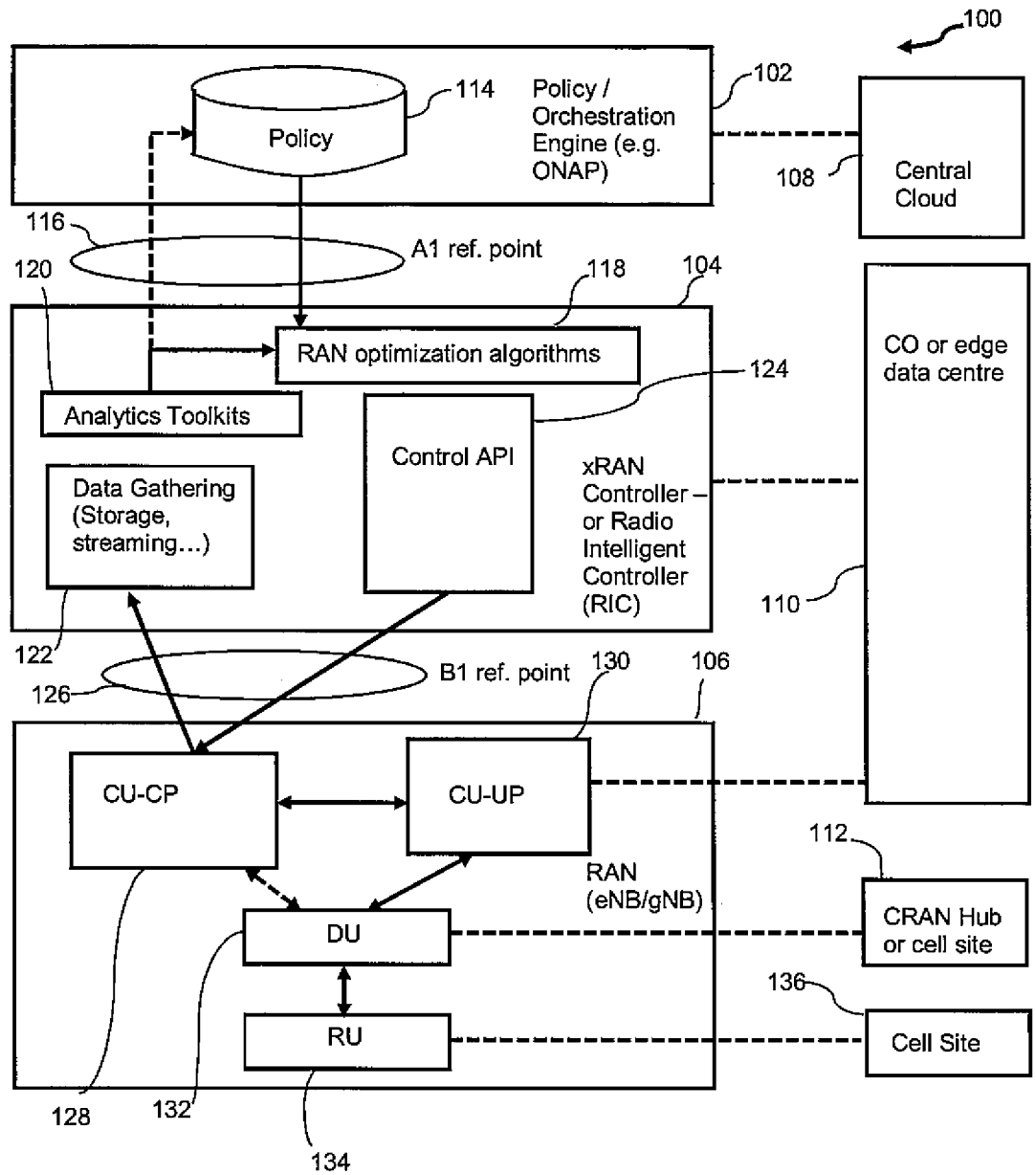
FIG. 1 shows schematically an example of a system.

Some examples may be provided in the context of network optimization.

Some examples of the invention may relate to optimization of Narrowband Internet of Things transmissions. A characteristic of internet-of-things communications is that the transmissions are typically short, delivering a small amount of data. A variety of technologies have been defined to support internet-of-things operation in cellular networks. These include NB-IOT, introduced in 3GPP Release 13, as well as eMTC (enhanced Machine-Type Communications), LTE-M (an extension of LTE meant to support IOT, sometimes described as LTE-Category-M1), etc. The subsequent description generically uses the term Narrowband Internet-of-Things and the abbreviation NB-IOT to mean any of these technologies, and depending on the context, may also refer specifically to the NB-IOT technology introduced in 3GPP Rel-13 to support introduction of low-cost devices for Internet of Things, along with corresponding capabilities in the Radio Access Network (RAN). NB-IOT devices may be deployed in a wide variety of coverage scenarios. For example NB-IOT may be deployed in outdoor scenarios (line of sight or non-line-of-sight) or inside buildings (where there may be heavy path loss).

NB-IOT devices may have differing capabilities (e.g. battery constraint vs powered by mains power, channel estimation accuracy, etc).

NB-IOT aims to be able to provide a very high level of coverage, up to a maximum coupling loss (MCL) of 164 dB, to account for a wide range of such deployment scenarios and constrained device capabilities. NB-IOT standards in 3GPP provide a number of options to a base station (eNB, gNB, or RAN) for improving coverage, based on flexible repetition options and Hybrid Automatic Repeat Request (HARQ).

In Long-Term Evolution (LTE) and 5G networks, the RAN (eNB/gNB) can perform link adaptation among the available transmission options to determine an appropriate transmission/retransmission strategy for a given device's channel situation. Conventional link adaptation in LTE (and also 5G) works by starting with an initial Modulation and Coding Scheme (MCS) and repetition level, and adjusting the MCS and repetition level based on acknowledgements, acks, and negative-acknowledgements, nacks, observed from the transmissions. Other parameters that can be adjusted include the power spectral density (or energy of transmission), etc. The link adaptation requires a sufficient number of continuous transmissions for a given device in order to attain the correct transmission/retransmission attributes (MCS, repetition, power, etc) appropriate for a given device. A repetition level can be considered to be the number of times a transmission is repeated. A higher repetition level improves the likelihood of the receiver being able to correctly decode the transmission, but consumes a greater number of resources on the air interface.

For NB-IOT transmissions, it may be useful to use the correct transmission attributes for maximizing capacity while providing appropriate coverage, especially as the available system bandwidth is quite small (narrow bands of 200 KHz may be used for NB-IOT). Also, as IOT devices may be power constrained (e.g. battery-powered), using suboptimal transmission attributes may result in too many unnecessary transmissions or retransmissions, leading to a power drain on devices. Moreover, using suboptimal transmission attributes may result in too much consumption of air interface resources, leading to poor throughput and system capacity or higher delays, and/or may result in poor coverage.

In NB-IOT transmissions, the amount of data to be transmitted for a given device at a given time is typically very small. It may be just a single packet. The data transmission may not last long enough for eNodeB link adaptation to discover the most appropriate transmission/retransmission attributes—the transmission may happen just at the transmission/repetition levels or other transmission attributes chosen for the initial transmission, and the transmission may be over even before the link adaptation process has managed to do any adaptation of the transmission attributes, or any significant adaptation, beyond the settings applied to the initial transmission.

Typically, in NB-IOT a User Equipment (UE) does not directly report any channel state feedback for the downlink (DL) channel such as Channel Quality Indicator (CQI), unlike normal LTE. Due to this the RAN may have to determine the proper transmission levels without any direct indication of the channel conditions from the user equipment. After an ack/nack for the first data transmission, a eNB may be able to take a first step for adapting the MCS/repetition etc with link adaptation, but since the overall transmission may last for a short duration, it may be difficult to reach the "correct" levels for small-size transmissions. In such examples, it may be important to properly select the transmission attributes for the first or initial data transmission of a user device, as well as the settings or adjustments of the transmission attributes for subsequent data transmissions.

The present inventors have identified that it may be beneficial to determine or select initial transmission attributes for the first or initial NB-IOT transmissions of user devices, as well as settings or adjustments of the transmission attributes for subsequent data transmissions. Poorly chosen initial settings or adjustments may result in suboptimal transmissions, impacting capacity and coverage, as well as causing delays for delivering data to a device. If the initial transmission attributes are too conservative, sufficient coverage may be achieved but at the expense of capacity. On the other hand, if the initial transmission attributes are too aggressive, throughput may be improved but may result in excessive retransmissions-resulting in long delays and/or poor coverage and/or battery impact on devices.

Although NB-IOT transmissions are discussed above, examples of the disclosure can also be applied in other forms, for example, in LTE Cat-M1 (LTE-M), enhanced Machine Type Communications (eMTC), or Cellular IOT extensions in 5G, etc.

An example of a system architecture that may be used in accordance with the invention is shown in FIG. 1. The exemplary system 100 comprises a policy/orchestration engine 102 (which may for example be an Open Network Automation Platform (ONAP)). Policy/orchestration engine 102 may comprise policy database 114. Policy/orchestration engine 102 may be connected to a central cloud service 108.

A controller is provided at 104. In some examples, the controller is an xRAN (extensible Radio Access Network) or oRAN (Open Radio Access Network) controller. In some examples, the controller may be considered a Radio Intelligent Controller (RIC). The controller 104 may comprise a RAN optimization algorithm component 118, an analytics toolkit component 120, a control Application Programming Interface (API) 124 and a data gathering component 122. The data gathering component 122 may be used for data storing and data streaming, for example.

Controller 104 may be connected to central office (CO) or edge data centre 110.

System 100 may also comprise RAN 106. RAN 106 may comprise an eNB or a gNB. RAN 106 may comprise, for example, a Central Unit Control Plane (CU-CP) 128, a Central Unit User Plane (CU-UP) 130, a Distributed Unit (DU) 132 and a radio unit (RU) 134. The RU 134 may be in communication with cell site 136. The DU 132 may be in communication with Cloud Radio Access Network 112.

In some examples, at least one of the elements 102, 104, 128, 120 and 132 are cloud-enabled, i.e. virtualized.

FIG. 1 also shows first reference point 116 and a second reference point 126. In the context of xRAN, the first reference point 116 comprises an A1 interface and the second reference point 126 comprises a B1 interface.

Figure 2:
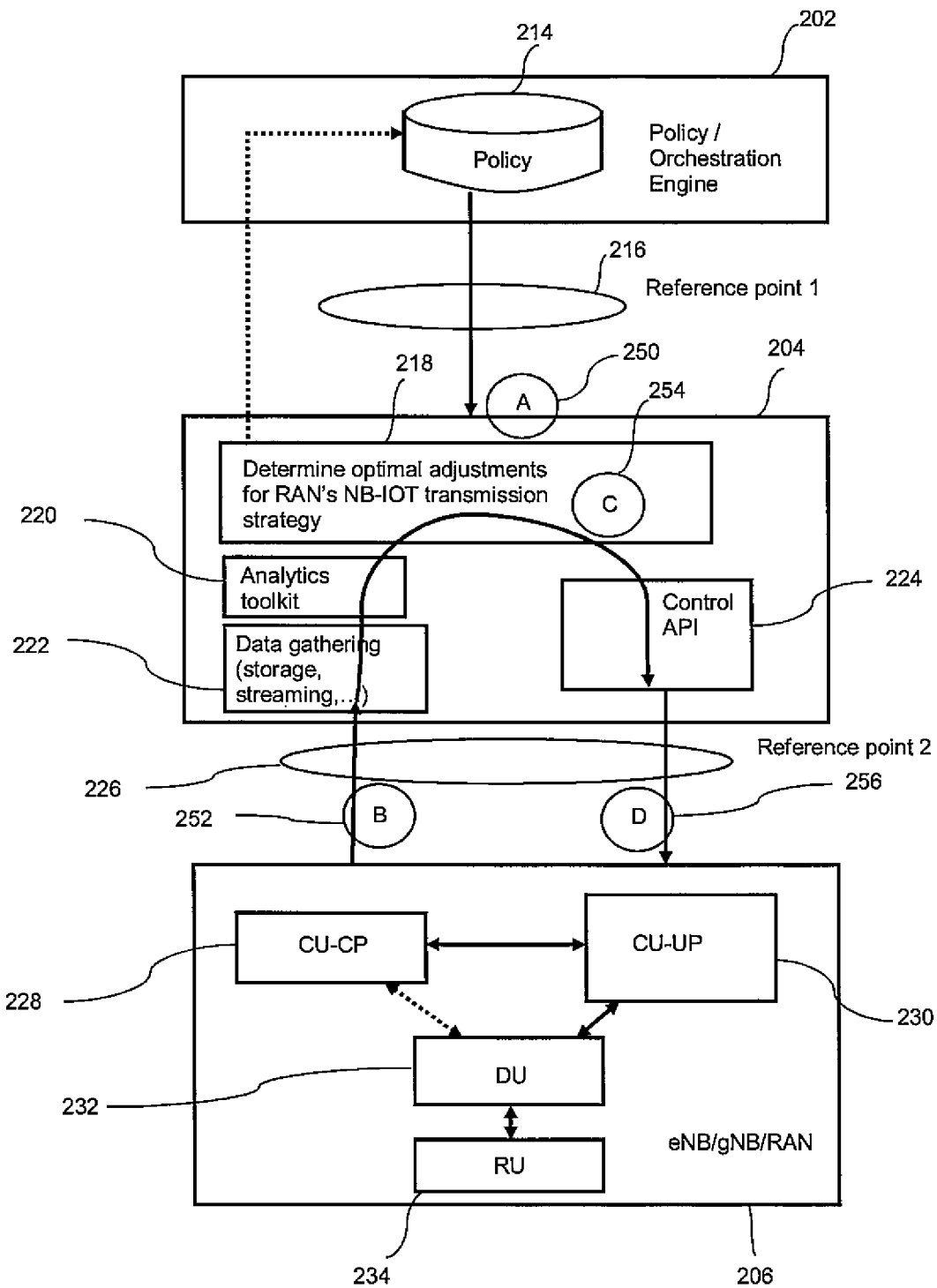
FIG. 2 shows schematically an example of a system.

FIG. 2 shows an exemplary system architecture. Components 202 to 206 are similar to components 102 to 106 of FIG. 1 and components 214 to 234 are similar to components 114 to 134 of FIG. 1. Components similar to components 108 to 112 and 136 are not shown in FIG. 2, however in some examples similar components could also be included in the system of FIG. 2.

In examples, controller 204 obtains information from RAN 206 on the results of various transmission actions. The transmissions may by uplink (UL) or downlink (DL) transmissions. The transmissions may by NB-IOT transmissions. The controller 204 may also obtain certain measurements from RAN 206.

In some examples, the controller 204 may use an optimization algorithm to devise optimal adjustments to the RAN's transmission strategy. These adjustments can be communicated to the RAN 206.

In some examples, the controller 204 can get inputs from policy/orchestration engine 202 to guide its optimization algorithm.

Examples may comprise the following aspects A-D. These aspects are described in relation to points 250, 252, 254 and 256 below.

Aspect A, which in examples takes place at 250 in FIG. 2, comprises providing, by policy/orchestration engine 202 to controller 204, policy inputs regarding the objectives that the controller's adjustment algorithm should achieve. This providing step takes place over an interface/Reference Point 216. In the context of xRAN this would be an A1 interface.

Exemplary elements of the provided policy may include at least one of: an indication of the desired balance of coverage vs capacity (e.g. relative weighting), an indication of the desired level of delay in delivering data or paging and an indication of the desired impact to device battery life.

Aspect B, which in examples takes place at 252 in FIG. 2, comprises providing, by a cell in an eNB/gNB/RAN 206 to controller 204, a set of data/attributes related to facilitating determination of optimal settings or adjustments of transmission attributes.

The providing step of aspect B takes place over a data exposure API/interface which is part of Reference Point 226. In the context of xRAN this would be a B1 interface.

Exemplary elements that may be provided include:
(i) information on the attributes used for executed transmissions (e.g. the number of repetitions used, the number of retransmissions attempted, the MCS used, etc);
(ii) indications of the status/outcomes of transmissions (e.g. a measure of the fractions of acks or nacks); and
(iii) indications of the quality of the signal received by the eNB for various UL transmissions (received Random Access Channel (RACH) power, or received Physical Uplink Shared Channel (PUSCH) power, interference or noise level, etc).

In some examples, the indications and the information may be provided on a per-transmission or per-PDU (packet data unit) basis, or as statistics/aggregate across transmissions for a given UE, or as statistics/aggregate across certain groups of UEs. The group of devices may be defined based on the device attributes, or channel quality of the signal or ack/nacks received from the device, etc.

Aspect C, which in examples takes place at 254 of FIG. 2, comprises making, by controller 204, a determination on optimal settings or adjustments of the transmission attributes to be used by RAN 206, taking into account the data/attributes received from the RAN 206 (discussed above with respect to aspect B). In some examples, the controller also takes into account the policy inputs from the policy/orchestration engine 202 (discussed above with respect to aspect A).

In some examples, the settings or adjustments determined by controller 204 comprise settings, adjustments, biasing factors and/or biasing offsets for:
(i) initial transmission attributes (MCS or repetition level or power level) i.e. those applied to the initial or first data transmission of a user device;
(ii) transmission attributes of subsequent retransmissions or new transmissions;
(iii) the transmission attributes of paging transmissions;
(iv) cell selection/reselection thresholds that can be broadcast to devices in idle mode.

These adjustments, biasing factors and/or biasing offsets may be determined to be applicable for all UEs, or for a subset/group of UEs.

In some examples, the controller 204 may use Machine Learning to decide the optimal transmission attributes based on the observations of data provided by the RAN (attributes of previously executed transmissions, outcomes/status of transmissions, received signal levels etc).

Aspect D, which in examples takes place at 256 in FIG. 2, comprises communicating, by controller 204 to the cell in eNB/gNB/RAN 206, indications of optimal adjustments to the transmission attributes to be used by RAN 206 as determined by the controller 204 (as discussed above in relation to aspect C).

In examples, this communication takes place over a control API/interface which is part of reference point 226. In the context of xRAN this would be a B1 interface.

Exemplary elements that may be transmitted to RAN 206 according to aspect D may comprise adjustments, biasing factors, biasing offsets and/or biasing weights related to optimal settings/adjustments to transmission/retransmission attributes or cell selection thresholds. Other exemplary elements comprise additional indications of one or more groups or classes of UEs to which these settings/adjustments etc. should apply, rather than to all UEs in the relevant cells.

Figure 3:
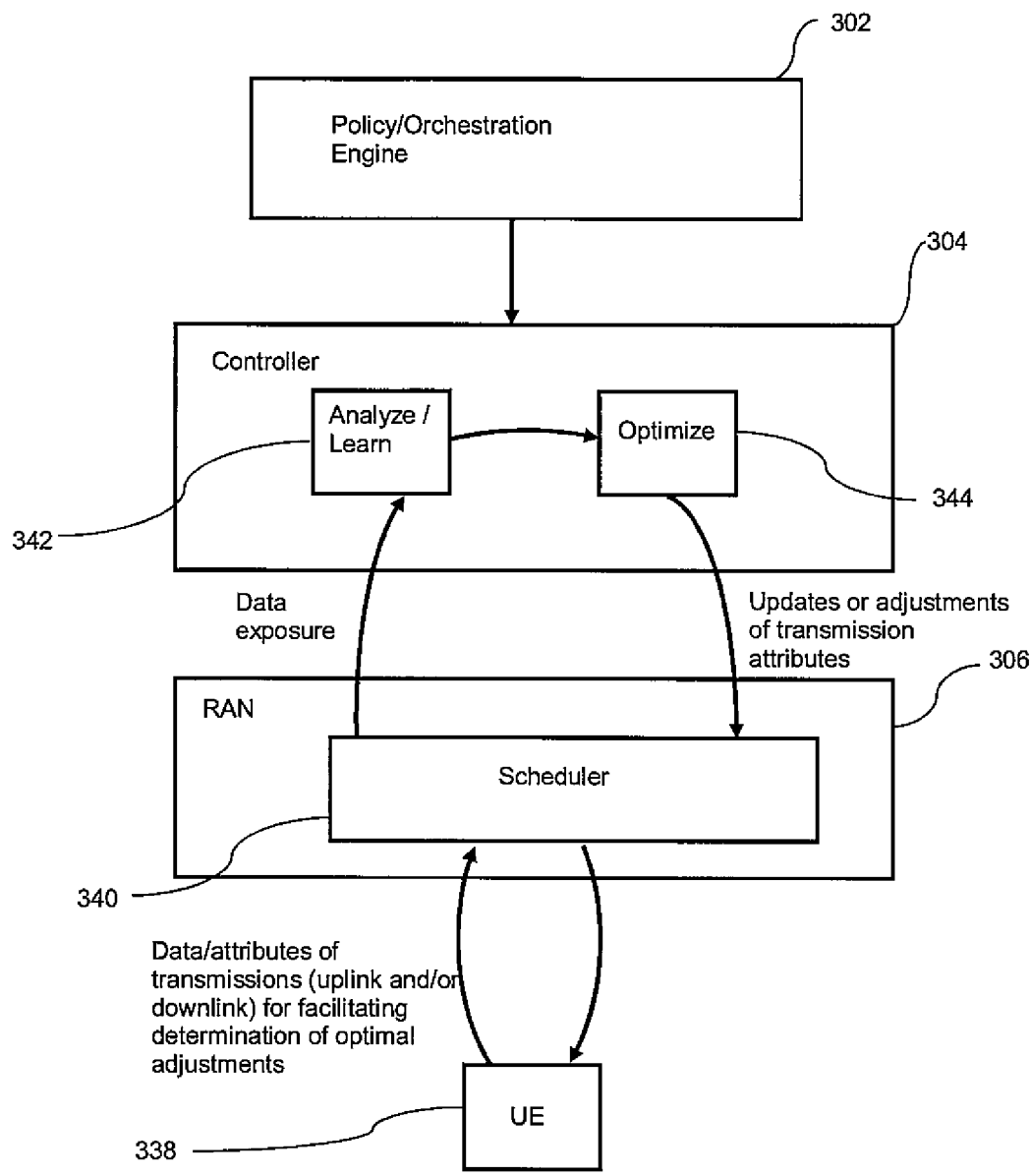
FIG. 3 shows schematically an example of a system.

FIG. 3 shows an example of a system in which the invention can be implemented. The system comprises policy/orchestration engine 302, controller 304, RAN 306 and UE 338.

Typically in the RAN, transmission attributes to be used for individual transmissions are determined by the RAN 306 via a scheduler module 340.

In examples, the controller 304 provides updates or adjustments to the RAN 306. In some examples, these can be sent from an optimization module 344 of controller 304 to scheduler 340 of RAN 306. The RAN 306 can use these to determine the attributes such as received RACH power, timing advance, power headroom report, etc. The controller 304 may also specify other attributes related to power control for UL transmission, such as p0 and alpha. These attributes are used to determine how the uplink transmit power should be adjusted based on a user equipment's path loss or other conditions.

A set of data/attributes related to facilitating determination of optimal adjustments of transmission attributes may be provided from RAN 306 (in some examples, from scheduler 340) to analysing/learning module 342.

Starting from the initial attributes provided by the controller 304, the RAN 306 (for example at scheduler 340) may further decide the attributes to be used for subsequent transmission or retransmission. This may be based, for example, on the Ack/Nack status of the earlier transmission. The RAN scheduler 340 may decide to increment the MCS or increment repetition level by a certain amount if the initial transmission status is a Nack, or the RAN scheduler may decide to decrement the MCS or decrement repetition level by a certain amount if the initial Tx status is an Ack.

Controller 304 may also provide adjustments/updates to the way the RAN 306 makes the decision for subsequent transmissions/retransmissions. For example, controller 304 may indicate adjustments/updates for the size of the increment or decrement for MCS or repetition level to use if the initial transmission is an Ack or Nack etc.

In some types of RAN, for example a 5G RAN where the RAN comprises a CU and a DU interconnected by an F1 interface, the relevant module for handling interactions with the controller may be at the DU. This may be for example in situations where the DU hosts the Scheduler and Medium Access Control (MAC)/physical layers. Two different architectures for this situation, where the relevant module for handling interactions with the controller is at the DU, are shown in FIGS. 4 and 5.

Figure 4:
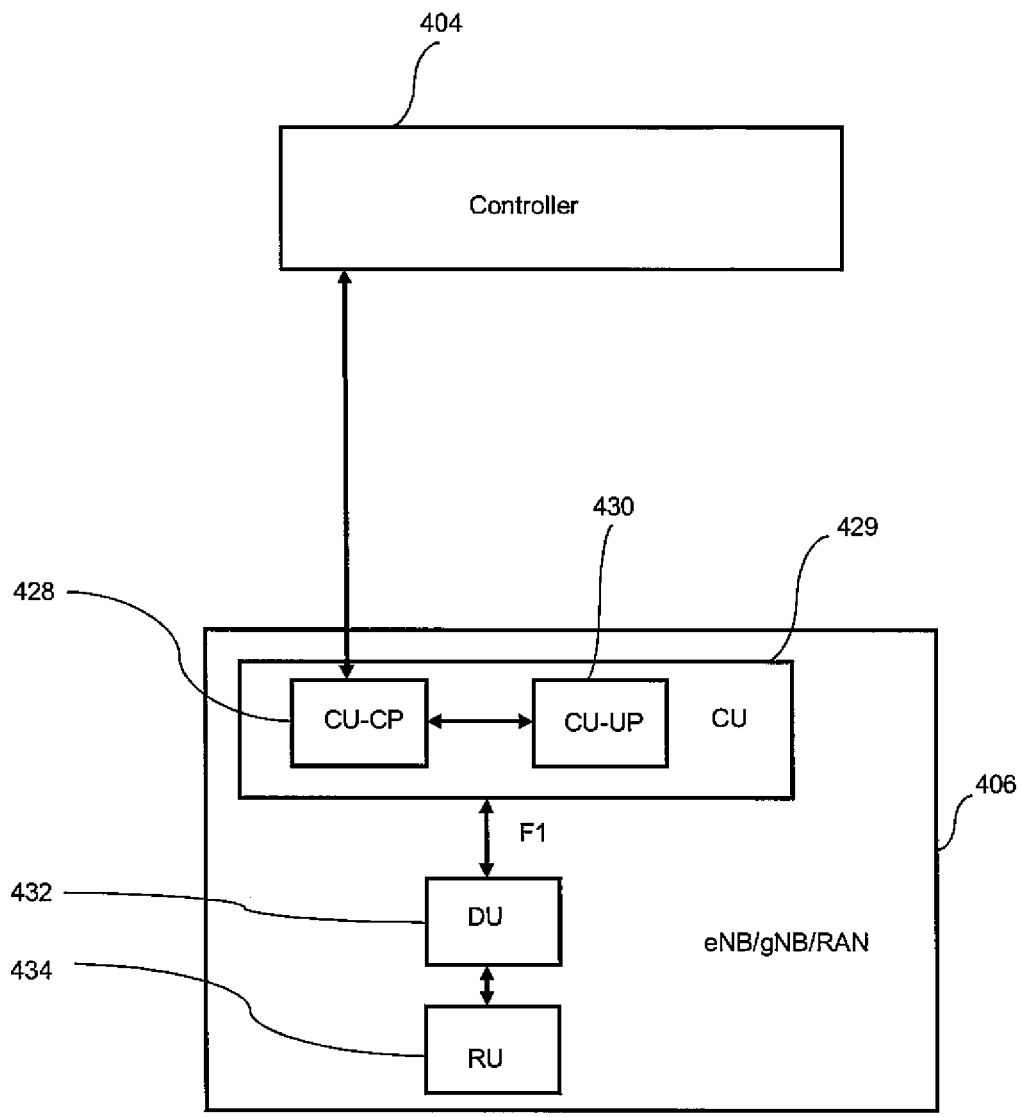
FIG. 4 shows schematically an example of an interface.

An exemplary architecture for an interface between a controller 404 and RAN 406 is shown in FIG. 4. Controller 404 may interact with RAN 406 in two steps. For example, for RAN 406 to provide information to the controller 404, the DU 432 may provide this information first to the CU 429. The CU 429 may comprise CU-CP 428 and CU-UP 430. In turn, the CU 429 may provide the information to the controller 404. In this example, DU 432 is also in communication with RU 434.

Figure 5:
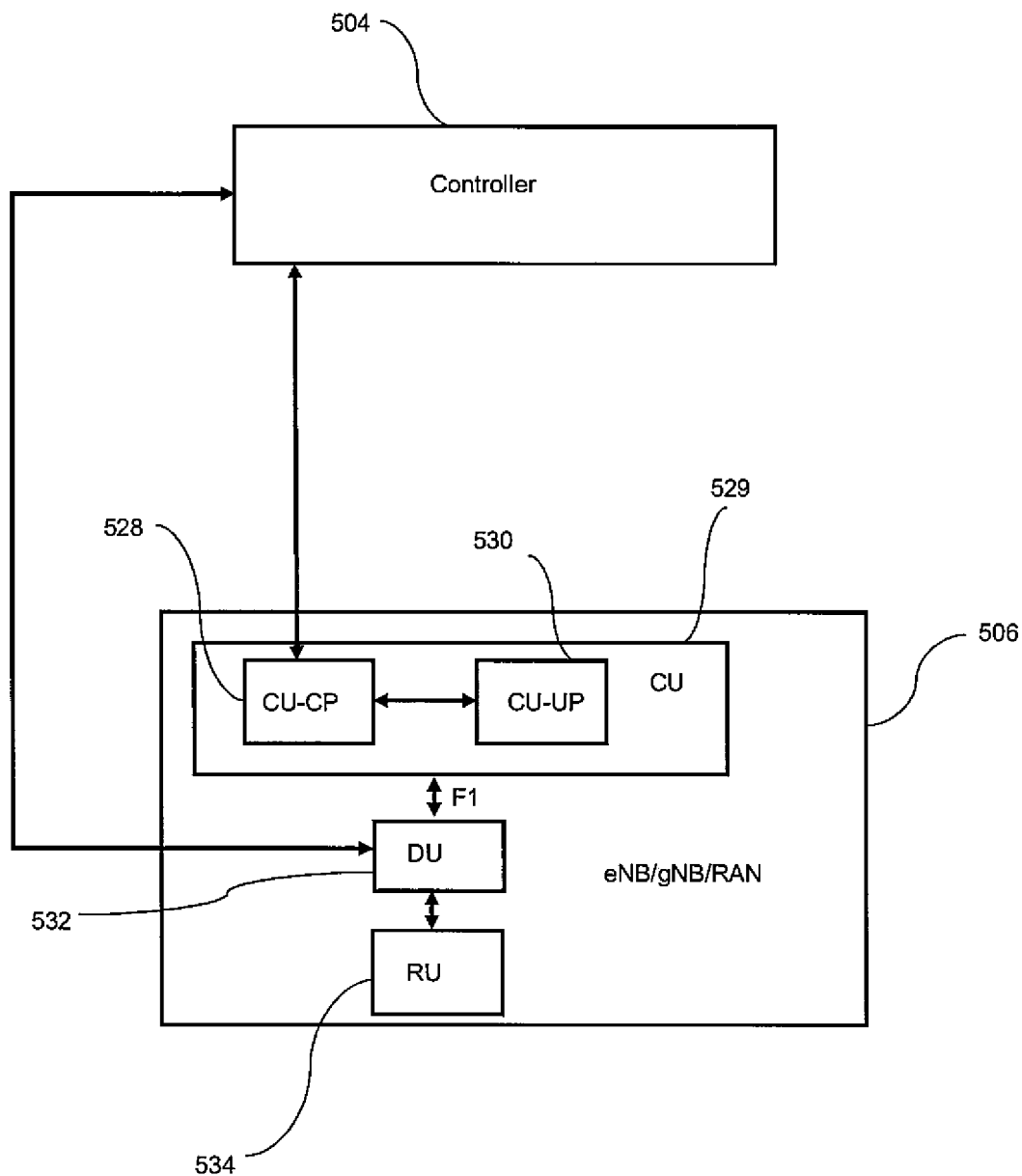
FIG. 5 shows schematically an example of an interface.

A further exemplary architecture for an interface between a controller 504 and RAN 506 is shown in FIG. 5. References 504 to 534 of FIG. 5 correspond to references 404 to 434 of FIG. 4. In this example, the controller 504 has a direct interface to DU 532 over which interactions between the controller 504 and 506 may be conducted.

In either of the exemplary architectures shown in FIGS. 4 and 5, it should be noted that the CU (429 or 529) may separately interact with the RAN 506 for example for other functions that the controller (404 or 504) may provide for the CU, such as load balancing or carrier aggregation optimization or the like.

Figure 6:
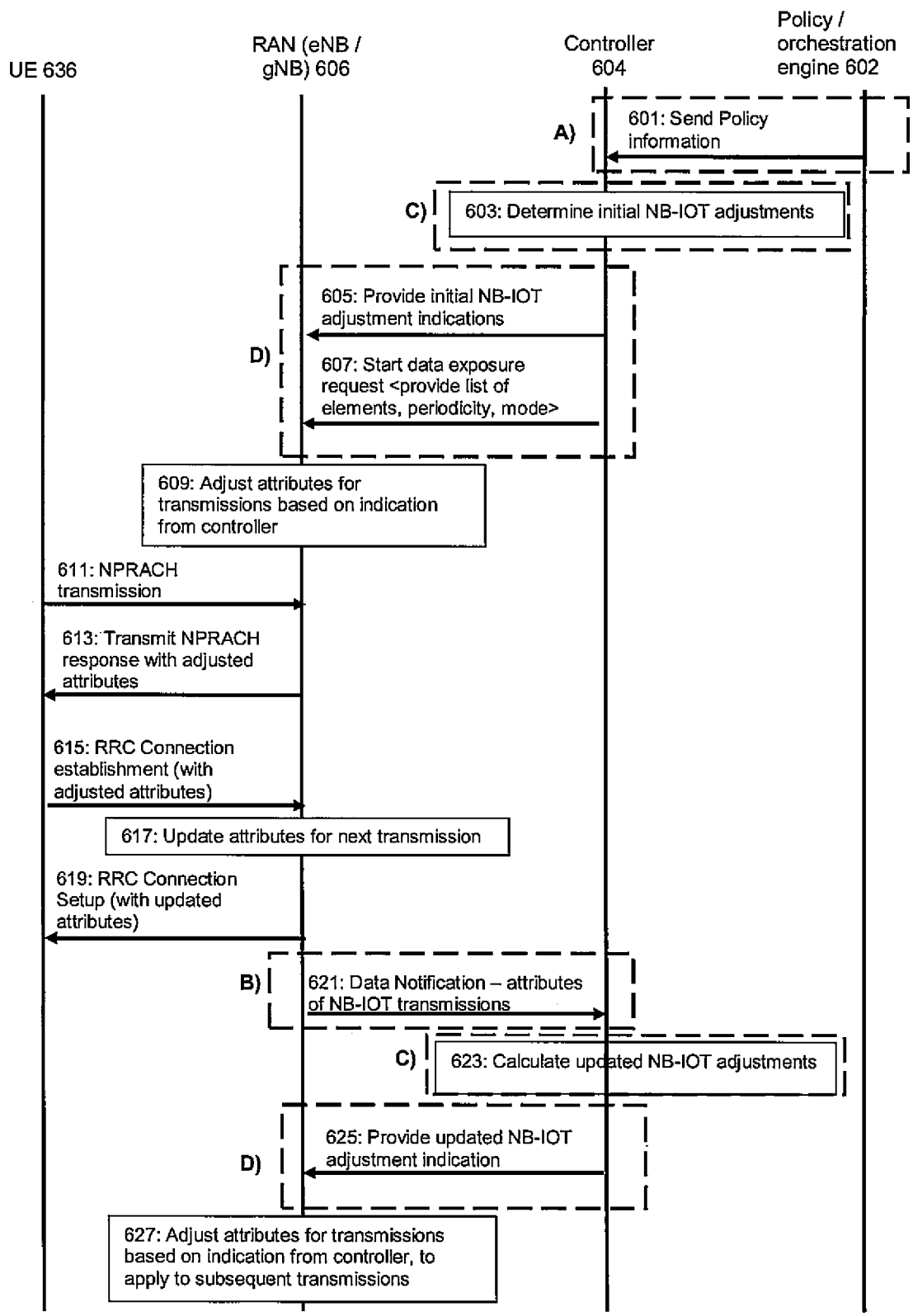
FIG. 6 shows an example of a message flow.

An example message flow is shown in FIG. 6. Although the message flow shown in FIG. 6 is for NB-IOT transmissions, it will be appreciated that a similar message flow may also be used for other types of transmissions such as LTE-M transmissions, eMTC transmissions, or cellular IOT extensions in 5G transmissions, etc. The message flow displayed is between policy/orchestration engine 602, controller 604, RAN 606 and UE 636. Aspects A to D discussed above are shown in relation to messages sent during the message flow. Aspects A to D are also discussed further below.

At 601, policy input information is sent from policy/orchestration engine 602 to controller 604. The controller can use this information to support an API in which an orchestration/policy engine (or in some examples, Operations Support System (OSS)) can provide policy inputs to the controller 604 to guide the controller's decision on optimal transmission attributes. In the context of xRAN, this API is part of the A1 interface.

Examples of policy input information that can be used are desired relative weighting or priorities of coverage, throughput, and device power consumption. Example policies may be: "under low load, aim to maximize coverage"; "under high load, 50% weight on coverage and 50% on throughput" or "prioritize coverage, and secondarily equal weight on throughput and device power consumption".

In some examples, policy input information may specify slice-level objectives on throughput and coverage. In this example, objectives are specified at slice-level rather than for cell as a whole. Thus within the NB-IOT carriers, there may be several slices, e.g. each slice serving devices belonging to a different enterprise or "tenant", and there may be different policy objectives for each slice.

The controller can use these policy inputs in its determination of optimal adjustments for transmission attributes. In the case of NB-IOT transmission, the controller can use these policy inputs in its determination of optimal adjustments for NB-IOT transmission attributes.

Aspect B is illustrated at 621 of FIG. 6. RAN 606 can provide information to controller 604 comprising a set of data/attributes to facilitate determination of optimal adjustments for transmission attributes. This information may be for NB-IOT transmissions. In the context of xRAN, this may be provided over the B1 interface.

An example of data that may be provided by RAN 606 to controller 604 for received RACH transmissions (or based on NarrowBand Physical Radio Access Channels (NPRACH) responses generated for the NPRACH) is various attributes related to the RACH such as the detected preamble, the received power level, the timing advance calculated from the RACH, the direction or angle of arrival, the temporary RNTI assigned, etc. The RAN 606 may provide either these characteristics, or some function of these attributes to the Controller 604.

For transmissions scheduled or executed, including, in examples Narrowband Physical Downlink Shared Channel (NPDSCH) transmissions, Narrowband Physical Downlink Control Channel (NPDCCH) transmissions, Narrowband Physical Uplink Shared. Channel (NPUSCH) transmissions, etc., the MCS, repetition level and aggregation level may be provided as part of the information to controller 604. For UL transmissions, received signal level and measured interference and/or noise level, or power control commands or transmit power adjustments can also be provided.

A further example of data that can be provided by RAN 606 to controller 604 comprises indications of the reception outcome or ack/nack status for transmissions, or power headroom reports (PHR) received from UEs.

The data may be provided at certain events, or periodically on an ongoing basis. The data may be provided by the RAN 606 as soon as it is available, or in batches. The information may be sent for each individual RACH (or RACH response) or DL or UL transmission, or aggregated as a batch containing information for multiple individual transmission, or as aggregate statistics (e.g. histogram, or quantized into percentiles, or as mean/median/min/max etc) of a group of transmissions. The identity of the UEs for which the data is being provided may also be indicated, for example via a temporary RNTI or C-RNTI.

In a Cloud RAN where the RAN 606 comprises a central unit (CU) and a distributed unit (DU) interconnected by F1 (in 5G) or V1 (in LTE), the above information may be compiled at the DU (which may host the Scheduler and MAC/physical layers). The controller 604 may have a direct interface to the DU over which the DU may provide this information, or the DU may provide this information first to the CU over F1 and the CU may in turn provide it to the controller 604.

Figure 7:
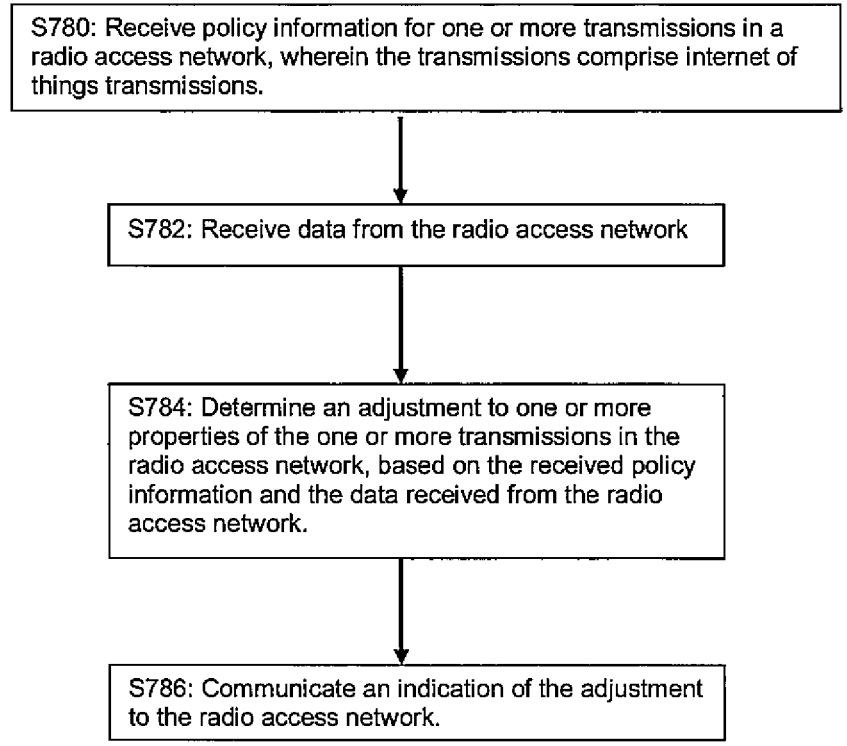
FIG. 7 shows an example of a method.

Aspect C, the determination of optimal adjustments by controller 604, is shown at 603 and 623 of FIG. 7. At 603, the controller 604 determines initial transmission adjustments. Transmissions may be transmissions to a user equipment on a data channel. In examples, adjustments to initial transmissions to a user equipment on a data channel (i.e. the first DL or UL data-channel transmission to/from a particular user equipment) may be determined. At 623, the controller calculates updated transmission adjustments. For NB-IOT transmissions, these transmission adjustments may be NB-IOT adjustments.

In an example, at 603 the controller 604 determines an initial MCS for transmissions in the RAN 606. The initial MCS may be determined as a function of outcomes of earlier transmissions (which may be represented, for example, by a ratio of ack/nacks) at various previously used MCS and repetition levels. In some examples, for each MCS and repetition level, controller 604 can transform to (i.e. determine) an equivalent coding rate, R (MCS, repetition), and calculate a probability of error based on the ratio of acks to nacks observed at that MCS and repetition level. This may be represented as P (MCS, repetition). Controller 624 can then select an MCS and repetition level that achieves a desired target error probability (X %), or as the MCS and repetition level that corresponds to the bottom Nth percentile of error probability across MCS and repetition levels. The desired target probability may be provided at 601. This MCS and repetition level may be communicated to the RAN at 605.

The target error probability and the desired bottom Nth percentile can be indicated to controller 604 by Policy/Orchestration Engine 602. This can be done over an A1 interface, for example, as shown at reference point 116 in FIG. 1. Controller 604 may take relative weights of coverage and throughput objectives into account, as provided by the Policy and Orchestration Engine 602. When there is a higher weight on coverage, controller 604 may use a smaller N (for the bottom Nth percentile) and/or a smaller desired target error probability X %. When there is a higher weight on throughput, controller 604 may use a higher N (for bottom Nth percentile) or a higher desired target error probability X %. If there are multiple options of (MCS, repetition level) pairs that achieve the desired targets, the one with the highest coding rate can be selected, in some examples.

In another example, controller 604 may determine an initial MCS to use for transmissions as a function of the characteristics of received RACH transmissions in the cells of RAN 606, such as received powers of RACH transmissions, the timing advance determined from the RACH, and the angle or direction of arrival. The controller 604 may receive an indication of these characteristics from RAN 606. Controller 604 may also take into account previously used MCS levels and repetition levels. The controller may then take in to account the resultant probability of nacks at different MCS and repetition levels, as well as received powers of RACH transmissions in the cells when determining an initial MCS to use.

For example, for each MCS and repetition level, controller 604 can transform to (i.e. determine) an equivalent coding rate R (MCS, repetition), and calculate a probability of error based on the ratio of nacks to acks observed at that MCS and repetition level P (MCS, repetition). The controller 604 can then associate the observations of P (MCS, repetition) to the original RACH characteristics, such as received power, timing advance, and direction of arrival, and other characteristics (or some subset of these), which may together be considered as a "signature" of the received RACH signal. Controller 604 may suitably quantize the RACH signatures. Controller 604 can therefore create a mapping of each RACH signature S (comprising received signal level, timing advance T, direction of arrival D, and possibly other characteristics) to P (MCS, repetition, S), where S can be suitably quantized.

For any given RACH signature S*, the Controller 604 can then determine a repetition level and MCS that achieves a desired target objective for that RACH signature S*. The objective may be based on the policy inputs received by controller 604 from the policy/Orchestration engine 602 at 601. For example, controller 604 may determine that the objective should be a target error probability of X1% (e.g. 5%) under low load, and a target error probability of X2% (e.g. 10%) under high load. The Controller may determine an estimate of the load on RAN 606 based on the information provided by RAN 606, and use this to select the target error probability. Once this is selected, the Controller can then determine the MCS and repetition level that achieves this desired target error probability for the RACH signature S*. This can be determined, for example, by accumulating observed ack/nack statistics for transmissions at different MCS levels to the UEs whose RACH signature was S*, and determining a MCS level that achieves a desired target error probability. The selected repetition level and MCS can then be communicated to the RAN to use as the initial MCS level at 605 whenever a RACH is received having a signature that is near to S*. At 605 the Controller may also communicate to the RAN 606 a mapping of various RACH signatures to the MCS and repetition level.

At 609, the RAN 606 can adjust transmission attributes based on the indication from the controller sent at 605. At 611, UE 636 sends an NPRACH transmission to RAN 606. RAN 606 responds at 613 by transmitting an NPRACH response with the adjusted transmission attributes (such as MCS and repetition level) that may be selected, for example, based on MCS and repetition level provided by controller 604 at 605, or based on the RACH signature of the UE's PRACH and the mapping of RACH signatures to MCS and repetition level provided by controller 604 at 605. At 615, an RRC connection establishment message is sent from the UE 636 to RAN 606 using the adjusted transmission attributes. At 617, RAN 606 updates transmission attributes for the next transmission. At 619, RAN 606 sends an RRC connection setup message (with updated attributes) to UE 636.

In some examples (not illustrated in FIG. 6), on receiving the NPRACH transmission 611, the RAN 606 may send a request to controller 604 providing the attributes of a received RACH (or providing a signature that is constructed based on attributes of the received RACH signal), and requesting controller 604 to provide the appropriate transmission attributes (such as MCS and repetition level and/or aggregation level for downlink control messages) that the RAN should use for responding to that particular RACH message. Examples of a received RACH that may be provided (or used for constructing a signature of the received RACH signal) are one or more of: a received RACH power level; a timing advance calculated for the RACH; a direction or angle of arrival for the RACH; a detected RACH preamble; an identity of a group of preambles from which the detected preamble was chosen by the UE; an indication of the RACH resource in which the preamble was detected. In this case controller 604 can determine the appropriate transmission attributes based on the RACH signature as described above, and provide that to the RAN. This can avoid controller 604 having to communicate to RAN 606 an entire mapping of various RACH signatures to transmission attributes.

In examples, controller 604 may use a Machine Learning technique to determine an adjustment to one or more properties of transmissions in the radio access network. This may be based on information provided by RAN 606. For example, controller 604 may use Reinforcement Learning with a Neural Network.

In examples, a neural network can be initially trained with a set of weights. The weights may be derived from a training set, for example from a system simulator.

The inputs to the neural network can be at least one of: the RACH received power; power head room reports; the sequence of MCS/repetition levels; coding rates used by RAN 606 (or for example, by a base station in the RAN); the number of retransmissions; the fraction of ack/nacks at each coding rate; the achieved effective throughput. In some examples the output of the neural network is a desired coding rate, which can be translated to a nearest choice of MCS and repetition rate.

The neural network can be initially trained using a system simulator. In the system simulator, various initial MCS and repetition rates can be tried. The sequence of MCS and repetition rates can be recorded as well as at least some of the following information corresponding to each respective MCS and repetition rate for transmission in the RAN 606: the ratio (or fraction) of acks/nacks; the average throughput in the RAN; the throughput of each UE 636; the latency of each UE 636; the RACH received power in the RAN 606; power headroom (which may be computed from path loss/shadowing).

For training purposes, in some examples an optimal MCS/repetition rate is chosen from among the ones tried, so as to maximize a desired function of average throughput and coverage (as represented by the achieved fraction of ack/nacks, or the 5th-precentile throughput, or 95th-percentile latency, for example). The neural network can then be initialized at controller 604 using the weights on each neuron derived from the initial training set.

Using the initialized neural network, controller 604 then can input, into the neural network, the data received from the RAN 606 for a particular cell in the RAN 606 to generate a selection of an optimal MCS and/or repetition rate for transmissions.

In examples, to effect Reinforcement Learning at controller 604, the controller 604 selects the neural-network-predicted MCS/repetition rate with probability X. With probability 1-X, the controller 604 also selects a random value of MCS/repetition rate as a random combination to try. In examples, the random combination is selected to be "near" but not identical to the neural-network predicted set (the preferred combination). The random combination may then then be communicated to the RAN 604 (for example at 605) along with the preferred combination. The RAN 606 can apply the preferred combination to a proportion of UEs in the RAN 606 and the random combination to a proportion in the RAN 606. In examples, RAN 606 applies the preferred combination to a larger proportion of UEs than the random combination. The resultant statistics (throughput, latency, fraction/ratio of ack/nacks, etc.) from the use of the MCS/repetition rates (the preferred combination and the random combination) may then be used to update/re-train the neural network, thereby expanding on the initial training set with new data directly from the observations from the RAN cell and providing a reinforcement learning. Combinations of MCS/repetition rate that result in high throughputs or low fraction/ratio of nacks may be preferred with higher utility compared to other combinations with low throughputs or high fraction/ratio of nacks during the updating/retraining of the neural network.

In addition to selecting, at 603, an optimal initial MCS/repetition rate for transmissions in the RAN 606, at 623 the controller 604 can also determine an adjustments to transmissions in the RAN after initial adjustments have been determined. This may comprise determining an adaptation of an increment or decrement in an MCS/repetition level that the RAN should use for link adaptation in response to ack/nacks.

This determination may be performed using similar methods as described above for the initial adjustments at 603, i.e., by using statistics-based and/or machine learning based techniques.

For example, controller 604 may observe a sequence of MCS/repetition rate increments or decrements used by RAN 606. This sequence may be communicated by RAN 606 to controller 604, for example at 621). and the fractions of ack/nacks achieved after using the increment/decrement compared to before the increment/decrement may also be communicated by RAN 606 to controller 604. Controller 604 can then determine whether the current increment/decrement used by RAN 606 should be increased, decreased or otherwise adjusted, by looking at whether the increment/decrement impacts the fraction of ack (or nacks) by greater or less than a desired target amount. The desired target amount may be included in policy information sent at 602. Controller 604 can then decide to increase or decrease the RAN's increment/decrement depending on whether the impact on fraction of acks is too low or too high.

Controller 604 also determine the transmission attributes for broadcast messages such as System Information Blocks (SIB) and paging. These transmission attributes may comprise attributes such as MCS/repetition rate and transmission power. For paging, the controller can observe the outcomes of paging transmissions (e.g. the rate at which UEs 636 successfully respond to paging messages) by the RAN 606 and statistically infer an appropriate MCS/repetition rate. For SIB messages, controller 604 can base the choice of MCS/repetition rate on the observed outcomes of transmissions to individual UEs 636 at different MCS/repetition rates. Controller 604 can also slowly reduce the MCS (or increase the repetition rate) to see if there is any significant increase in the fraction of UEs that are able to connect at the reduced MCS/higher repetition rate. Controller 604 can also slowly reduce the MCS (or increase the repetition rate) to see whether the UEs 636 that are connecting are at a deeper coverage level (which may correspond to a lower received RACH power). If there is no further increase in the population for UEs 636 at the deeper coverage level, then the SIB MCS can be increased (or repetition rate lowered).

Controller 604 may also determine power control parameters (P0 and alpha) using substantially similar statistical or neural network methods, for example to keep the received power (or a difference or ratio of received power relative to interference+noise level) for UL transmissions to be near (not too high or not too low) compared to a desired target threshold. The desired target threshold may be sent by the policy/orchestration engine 602 to controller 604 at 601.

In a case where the method is used for NB-IOT transmissions within an NB-IOT cell, there may be users belonging to different tenants (for example different enterprises). The users of one tenant may be grouped into a slice. Controller 604 may determine different adjustments for UEs 636 of different tenants. For example different tenants may ask for different weights on coverage or throughput, leading to different selections of MCS and repetition levels for different tenants. Or, the deployment scenarios or UE capabilities of different tenants may be different (e.g. some tenants may deploy meters deep inside basement, while other tenants may have sensors deployed outdoors), so that the selection of MCS and repetition levels may be performed separately for different tenants. In this case, the data reported by the RAN 606 to the controller 604 at 621 and 607 may identify which data belongs to which tenants or slice. When communicating determined adjustments to RAN 606 at 605 or 625, as well as when requesting data to be sent from RAN 606 to controller 604 at 607, controller 604 may identify which tenant or slice the adjustment(s) and/or request(s) is/are intended for (for example by using a tenant ID or a slice ID).

Aspect D may comprise communicating indications of adjustments to the transmission attributes to be used by RAN 606 as determined by the controller 604 (as discussed above in relation to aspect C). These can either be provided as initial adjustments at 605 or as updated adjustments at 625. In response to the updated adjustments sent at 625, the RAN 606 may adjust attributes for transmissions based on an indication from the controller, and use the adjusted attributes in subsequent transmissions. This is shown at 627. Aspect D also comprises sending a request at 607 for data exposure from the RAN 606 to controller 604. This request may comprise a request for transmission attributes to be sent from the RAN 606 to the controller 604.

At 605 and 621, controller 604 can provide to RAN 606 control actions/indications comprising adjustments for transmissions determined by the controller. These adjustments may be for NB-IOT transmissions. In the context of xRAN, these control actions/indications may be sent over the B1 interface.

Examples of control actions/indications include:
An adjustment to MCS and repetition rate to use for new/initial transmissions;
An adjustment to the increment or decrement that is used by RAN 606 to adapt the MCS/repetition rate on receiving ack or nack for a transmission;
An indication of whether the adjustments are for NPDSCH or NPUSCH;
An adjustment to Control Channel Elements (CCEs) or aggregation level for NPDCCH;
An adjustment to the MCS/repetition rate for paging or SIB messages;
An adjustment to power control parameters P0 and alpha for UL transmissions;
An adjustment to the MCS and repetition rate used for broadcast messages, such as paging or SIB.
A mapping of RACH signatures to the adjustments to transmission attributes for DL and/or UL transmissions.

For each of the above exemplary control actions/indications, the priorities/weights/offsets etc. can be indicated as numeric values, or may be indicated as relative change (e.g. +/−Delta) to previously communicated values.

In examples, the controller may also provide, along with a control action, an indication of a particular group or class of NB-IOT-capable UEs to which the control action should be applied, rather than applying it to all UEs in a cell of RAN 606.

Thus, each of the above control actions/indications sent from controller 604 to RAN 606 may carry an additional indication to indicate that the transmission adjustment should be applied to UEs 636 belonging to one or more indicated classes, rather than to all UEs 636 in the RAN 606.

In some examples, different transmission adjustments may be determined by controller 604 for different classes of UEs 636. For example, for battery-constrained devices, a different type of transmission adjustment may be determined than for mains-powered devices. Or, for devices in deep coverage situations, a different transmission adjustment may be determined than for shallow coverage devices. In each case, the different transmission adjustments may be conveyed by controller 604 to the RAN 606 along with indications of which group of UEs 636 in the RAN 606 that the transmission adjustments should apply to.

In the 5G architecture (or in LTE Cloud RAN), where the upper layers of the RAN form a "CU" (centralized unit—which may be deployed in an edge cloud) and the lower layers form a "DU" (distributed unit—which may be deployed at a cell site) with the CU and DU interconnected by F1 interface, the cell configuration/addition/deletion decisions may be performed in the CU while the cell activation/deactivation decisions may be made in the DU.

In some examples, controller 604 may have separate interfaces to the CU and DU, so that it can directly provide the relevant control actions/indications to the CU and DU respectively.

In some examples, controller 604 may have an interface to the CU, and communicates control actions/indications to the CU. The CU may then provide to the DU the relevant actions/indications impacting the operations performed by the DU.

FIG. 7 shows an example method. The method may be performed by a controller in a network. The method comprises receiving policy information for one or more transmissions in a radio access network, wherein the transmissions comprise internet of things transmissions at S780. At S782 the method comprises receiving data from the radio access network. At S784, the method comprises determining an adjustment to one or more properties of the one or more transmissions in the radio access network, based on the received policy information and the data received from the radio access network. At S786, the method comprises communicating an indication of the adjustment to the radio access network.

In general, the various examples shown may be implemented in hardware or in special purpose circuits, software, logic or any combination thereof. Some aspects may be implemented in hardware, while other aspects may be implemented in firmware or software which may be executed by a controller, microprocessor or other computing device, although the invention is not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Some embodiments may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out methods are described in the present disclosure. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Examples of the disclosed embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. An apparatus comprising
at least one processor,
at least one memory storing instructions that, when executed by the at least one processor, cause the apparatus to at least perform:
receiving, at a controller in a cellular system and over a first interface between the controller and an orchestration engine, policy information for one or more transmissions in a radio access network of the cellular system;
receiving, at the controller over a second interface between the controller and the radio access network, data from the radio access network, wherein the data received from the radio access network comprises data of one or more properties of previous transmissions between the radio access network and user equipment;
determining, by the controller, an adjustment to the one or more properties of the one or more transmissions in the radio access network between the radio access network and user equipment, based on the received policy information and the data received from the radio access network, wherein the determining the adjustment to the one or more properties of the one or more transmissions in the radio access network comprises using machine learning using a neural network by the controller to determine the adjustment based on the one or more properties of the previous transmissions between the radio access network and user equipment that comprise one or both of received Random Access Channel (RACH) power in the radio access network or a power headroom report from the radio access network; and
communicating, by the controller over the second interface, an indication of the adjustment to the radio access network;
wherein the one or more transmissions comprise internet of things transmissions; and
wherein the one or more transmissions in the radio access network comprise an initial transmission on a downlink data channel to a user equipment or an initial transmission on an uplink data channel from the user equipment.

2. The apparatus according to claim 1, wherein the data of previous transmissions in the radio access network comprises data of one or more of: a number of repetitions used in at least one previous transmission; a power level of at least one previous transmission; or a modulation and coding scheme used in at least one previous transmission.

3. The apparatus according to claim 1, wherein the policy information comprises weighting information or priority information of one or more of: radio access network coverage; radio access network throughput; or power consumption of at least one device connected to the radio access network.

4. The apparatus according to claim 1, wherein the data received from the radio access network comprises information of a ratio of acknowledgments to negative acknowledgements or a number of retransmissions attempted.

5. The apparatus according to claim 4, wherein the determining the adjustment to the one or more properties of the one or more transmissions in the radio access network comprises using the ratio of acknowledgments to negative acknowledgements or a number of retransmissions attempted.

6. The apparatus according to claim 1, wherein the data received from the radio access network comprises an indication of a quality of a signal received, for uplink transmission, by a base station in the radio access network, wherein the data comprises at least one of: the received random access channel (RACH) power; received physical uplink shared channel power; interference levels; or noise levels.

7. The apparatus according to claim 1, wherein the data received from the radio access network comprises information related to attributes of received random access transmissions, wherein the information related to the attributes of the received random access transmissions comprises at least one of: a detected preamble, a received power level; a timing advance calculated from a random access channel; an angle of arrival; a direction of arrival; and a radio network temporary identifier.

8. The apparatus according to claim 1, wherein the one or more properties of the one or more transmissions in the radio access network comprise one or more of: a modulation and coding scheme; a repetition level for transmissions in the radio access network; a number of control channel elements; a transmit power level; or a power control adjustment.

9. The apparatus according to claim 1, wherein the at least one memory further stores instructions that, when executed by the at least one processor, cause the apparatus to further perform:
receiving a request from the radio access network, the request comprising attributes of a random access channel message received by the radio access network, and
providing, to the radio access network in response to the request, appropriate transmission attributes for responding to the random access channel message.

10. The apparatus according to claim 1, wherein communicating the indication of the adjustment to the radio access network comprises providing to the radio access network at least one of:
an adjustment to one or both of the following: a modulation and coding scheme or repetition rate to use for initial transmissions;
an adjustment to one or both of the following: one or both of an increment or decrement that is used by the radio access network to adapt a modulation and coding scheme or repetition rate on receiving an acknowledgement or a negative acknowledgement for a transmission;
an adjustment to one or both of the following: at least one control channel element or aggregation level for a narrowband physical downlink control channel in the radio access network; or
a mapping of random access channel signatures to one or both of the following: the adjustments to transmission attributes for downlink or uplink transmissions in the radio access network.

11. The apparatus according to claim 10, wherein a random access channel signature comprises at least one of:
a received power level for a random access transmission;
a timing advance calculated from a random access channel transmission; or
a direction or angle of arrival for a received random access channel transmission.

12. The apparatus according to claim 1, wherein the data of the one or more properties of the previous transmissions in the radio access network comprise outcomes of the previous transmissions, and wherein the one or more properties for the initial transmission on the downlink data channel to the user equipment or the initial transmission on the uplink data channel from the user equipment are determined as a function of the outcomes of the data of the previous transmissions in the radio access network.

13. A method comprising:
    receiving, at a controller in a cellular system and over a first interface between the controller and an orchestration engine, policy information for one or more transmissions in a radio access network of the cellular system;
    receiving, at the controller over a second interface between the controller and the radio access network, data from the radio access network, wherein the data received from the radio access network comprises data of one or more properties of previous transmissions between the radio access network and user equipment;
    determining, by the controller, an adjustment to the one or more properties of the one or more transmissions in the radio access network between the radio access network and user equipment, based on the received policy information and the data received from the radio access network, wherein the determining the adjustment to the one or more properties of the one or more transmissions in the radio access network comprises using machine learning using a neural network by the controller to determine the adjustment based on the one or more properties of the previous transmissions between the radio access network and user equipment that comprise one or both of received Random Access Channel (RACH) power in the radio access network or a power headroom report from the radio access network; and
    communicating, by the controller over the second interface, an indication of the adjustment to the radio access network;
    wherein the one or more transmissions comprise internet of things transmissions; and
    wherein the one or more transmissions in the radio access network comprise an initial transmission on a downlink data channel to a user equipment or an initial transmission on an uplink data channel from the user equipment.

14. The method according to claim 13, wherein the data of previous transmissions in the radio access network comprises data of one or more of: a number of repetitions used in at least one previous transmission; a power level of at least one previous transmission; or a modulation and coding scheme used in at least one previous transmission.

15. The method according to claim 13, wherein the policy information comprises weighting information or priority information of one or more of: radio access network coverage; radio access network throughput; or power consumption of at least one device connected to the radio access network.

16. The method according to claim 13, wherein the data of the one or more properties of the previous transmissions in the radio access network comprise outcomes of the previous transmissions, and wherein the one or more properties for the initial transmission on the downlink data channel to the user equipment or the initial transmission on the uplink data channel from the user equipment are determined as a function of the outcomes of the data of the previous transmissions in the radio access network.

17. A non-transitory computer readable medium comprising program instructions stored thereon for causing an apparatus to perform at least the following:
    receiving, at a controller in a cellular system and over a first interface between the controller and an orchestration engine, policy information for one or more transmissions in a radio access network of the cellular system;
    receiving, at the controller over a second interface between the controller and the radio access network, data from the radio access network, wherein the data received from the radio access network comprises data of one or more properties of previous transmissions between the radio access network and user equipment;
    determining, by the controller, an adjustment to the one or more properties of the one or more transmissions in the radio access network between the radio access network and user equipment, based on the received policy information and the data received from the radio access network, wherein the determining the adjustment to the one or more properties of the one or more transmissions in the radio access network comprises using machine learning using a neural network by the controller to determine the adjustment based on the one or more properties of the previous transmissions between the radio access network and user equipment that comprise one or both of received Random Access Channel (RACH) power in the radio access network or a power headroom report from the radio access network; and
    communicating, by the controller over the second interface, an indication of the adjustment to the radio access network;
    wherein the transmissions comprise internet of things transmissions; and
    wherein the one or more transmissions in the radio access network comprise an initial transmission on a downlink data channel to a user equipment or an initial transmission on an uplink data channel from the user equipment.

18. The non-transitory computer readable medium according to claim 17, wherein the data of the one or more properties of the previous transmissions in the radio access network comprise outcomes of the previous transmissions, and wherein the one or more properties for the initial transmission on the downlink data channel to the user equipment or the initial transmission on the uplink data channel from the user equipment are determined as a function of the outcomes of the data of the previous transmissions in the radio access network.

* * * * *